US008160562B2

(12) United States Patent  
Yuki et al.

(10) Patent No.: US 8,160,562 B2  
(45) Date of Patent: *Apr. 17, 2012

(54) MOBILE TERMINAL DEVICE AND PROGRAM SELECTION METHOD

(75) Inventors: Yasuhiro Yuki, Kanagawa (JP); Kazunori Yamada, Kanagawa (JP); Etsumi Kanaya, Tokyo (JP)

(73) Assignee: Panasonic Corporation, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/162,939

(22) Filed: Jun. 17, 2011

(65) Prior Publication Data

US 2011/0252379 A1     Oct. 13, 2011

Related U.S. Application Data

(63) Continuation of application No. 11/719,592, filed as application No. PCT/JP2005/020855 on Nov. 14, 2005, now Pat. No. 7,986,945.

(30) Foreign Application Priority Data

Nov. 17, 2004   (JP) .................................. 2004-333137

(51) Int. Cl.
```
H04M 3/00       (2006.01)
H04M 3/42       (2006.01)
H04M 1/00       (2006.01)
G06F 17/00      (2006.01)
G06F 3/048      (2006.01)
G09G 5/00       (2006.01)
```
(52) U.S. Cl. ................... 455/418; 455/414.1; 455/550.1; 455/566; 455/186.1; 715/204; 715/788; 715/792; 345/172; 345/169

(58) Field of Classification Search .................. 345/168, 345/169, 171, 172; 710/67, 8–10; 715/204, 715/788, 792, 847; 725/37, 38, 61, 62, 86, 725/87, 100, 132; 455/414.1, 418–419, 425, 455/575.1, 186.1, 550.1, 556, 566

See application file for complete search history.

(56) References Cited

U.S. PATENT DOCUMENTS 6,760,583 B2     7/2004   Ito et al.  
(Continued)

FOREIGN PATENT DOCUMENTS

JP          62-187344          11/1987  
(Continued)

OTHER PUBLICATIONS

International Search Report for PCT/JP2005/020855, dated Jan. 31, 2006.

*Primary Examiner* — Wesley Kim  
(74) *Attorney, Agent, or Firm* — Seed IP Law Group PLLC

(57) ABSTRACT

A portable terminal apparatus which can select terminal operations such as the activation of programs, the switching of the programs and the ending of the programs with a reduced number of times of operation of the operation buttons is provided. The portable terminal apparatus includes link information storage means 14 for storing therein a linkage table containing information about the linkage between operation buttons to be selected by a user and programs to be activated by the selection of the operation buttons, and an activation program monitor part 14 for dynamically monitoring the operation states of two or more programs activated at a terminal end, wherein the operation button having emitted its backlight according to the monitoring result obtained by the activation program monitor part 14 can be selected by the user, so that the programs linked to the respective operation buttons can be easily activated, switched and ended.

4 Claims, 20 Drawing Sheets

U.S. PATENT DOCUMENTS

| | | | |
|---|---|---|---|
| 6,980,236 B1 * | 12/2005 | Kojima et al. | 348/207.99 |
| 7,146,193 B2 | 12/2006 | Shitahaku | |
| 7,215,282 B2 | 5/2007 | Boling et al. | |
| 7,539,795 B2 * | 5/2009 | Vahtola | 710/67 |
| 2001/0003097 A1 | 6/2001 | Jeoung | |
| 2003/0156074 A1 * | 8/2003 | Ranganathan et al. | 345/1.1 |
| 2004/0239637 A1 * | 12/2004 | Williams et al. | 345/172 |
| 2005/0149879 A1 * | 7/2005 | Jobs et al. | 715/796 |

FOREIGN PATENT DOCUMENTS

| | | |
|---|---|---|
| JP | 3-189715 | 8/1991 |
| JP | 8-278872 | 10/1996 |
| JP | 10-312263 | 11/1998 |
| JP | 2003-209610 | 7/2003 |
| JP | 35-24859 | 2/2004 |

* cited by examiner

FIG. 6

| TASK ID (T-ID) | 1 | 2 | 3 | ... | N |
|---|---|---|---|---|---|
| BUTTON ID (B-ID) | B1 | B2 | B3 | | - |
| PROGRAM ID (P-ID) | P1 | P1 | P2 | | - |

FIG. 7

| PROGRAM ID | PROGRAM |
|---|---|
| P1 | BROWSER |
| P2 | MAIL SOFTWARE |
| ... | ... |
| PN | - |

FIG. 8

| TASK ID (T-ID) | 1 | 2 | 3 | ... | N |
|---|---|---|---|---|---|
| BUTTON ID (B-ID) | [B3] | B1 | [B2] | | - |
| PROGRAM ID (P-ID) | P1 | P1 | P2 | | - |

FIG. 9

| PROGRAM ID | PROGRAM | EMITTING LIGHT COLOR |
|---|---|---|
| P1 | BROWSER | GREEN |
| P2 | MAIL SOFTWARE | BLUE |
| P3 | MESSENGER (IMPS) | YELLOW |
| P4 | TRANSCEIVER (PoC) | ORANGE |
| P5 | TELEVISION | RED |
| ... | ... | ... |
| PN | - | - |

FIG. 10

| PROGRAM ID | PROGRAM | EMITTING LIGHT COLOR | SHORT DEPRESSION | LONG DEPRESSION |
|---|---|---|---|---|
| P1 | BROWSER | GREEN | SWITCHING | END |
| P2 | MAIL SOFTWARE | BLUE | SWITCHING | NEW CREATION |
| P3 | MESSENGER (IMPS) | YELLOW | SWITCHING | STATE CHANGE |
| P4 | TRANSCEIVER (PoC) | ORANGE | RESPONSE | RECORDING |
| P5 | TELEVISION | RED | SWITCHING | ERASING |
| ... | ... | ... | ... | ... |
| PN | – | – | – | – |

FIG. 11

| PROGRAM ID | PROGRAM | OPERATION | EMITTING LIGHT PATTERN |
|---|---|---|---|
| P1 | BROWSER | WAITING FOR READING | TURN-ON |
| | | PAGE UPDATE OCCURRING TIME | BLINKING |
| P2 | MAIL SOFTWARE | WAITING FOR READING | TURN-ON |
| | | MAIL RECEIVING TIME | BLINKING |
| P3 | MESSENGER (IMPS) | WAITING FOR READING | TURN-ON |
| | | MESSAGE RECEIVING TIME | BLINKING |
| | | OFF LINE SWITCHING TIME | TURN-OFF |
| P4 | TRANSCEIVER (PoC) | WAITING TIME | TURN-ON |
| | | MESSAGE RECEIVING TIME | BLINKING |
| | | OFF LINE TIME | TURN-OFF |
| P5 | TELEVISION | WAITING FOR READING | TURN-ON |
| | | DURING PAY TV WATCHING | BLINKING |
| P6 | GAME (JAVA) | WAITING TIME | TURN-ON |
| | | UNDER CONNECTION WITH NETWORK | BLINKING |
| ... | ... | ... | ... |
| PN | – | – | – |

| TASK ID (T-ID) | 1 | 2 | 3 | ... | N |
|---|---|---|---|---|---|
| BUTTON ID (B-ID) | B1 | B2 | B3 | | - |
| PROGRAM ID (P-ID) | P1 | P1 | P2 | | - |
| CONTENTS ID (C-ID) | C1 | C2 | C5 | | |

| CONTENTS ID | KINDS OF CONTENTS | EMITTING LIGHT COLOR |
|---|---|---|
| C1 | CHARACTER-SYSTEM CONTENTS | GREEN |
| C2 | IMAGE-SYSTEM CONTENTS | BLUE |
| C3 | CHAT-SYSTEM CONTENTS | YELLOW |
| C4 | CONTENTS HAVING TIME LIMIT | ORANGE |
| C5 | CONTENTS REQUIRING CHARGE | RED |
| ... | ... | |
| CN | -- | |

(a)  (b)

MOBILE TERMINAL DEVICE AND PROGRAM SELECTION METHOD

BACKGROUND

1. Technical Field

The present invention relates to a portable terminal apparatus and a program select method.

2. Description of the Related Art

In a portable terminal apparatus such as a cellular phone, two or more functions such as a telephone number retrieval function, a game function and a camera function are allocated to their associated buttons as a previously fixedly decided menu and, when a user selects one of the buttons, the user can execute a desired function.

Recently, as the portable terminal has advanced in function, there has been run short of the number of buttons to which the functions of the portable terminal are allocated. To resolve the shortage of the number of operation buttons, at the present, there is proposed a portable terminal in which, in addition to operation buttons "0"~"9", there are provided two or more guide operation buttons and, by using one guide operation button, any one of two or more functions guided and displayed on the guide display part of the portable terminal can be selected.

Also, there is also provided a portable terminal apparatus in which the colors of the backlights of guide operation buttons are linked to the display colors of guides to thereby prevent the wrong depression of the guide operation buttons (for example, see the patent reference 1).

Patent Reference 1: JP2003-209610

BRIEF SUMMARY

Problems that the Invention is to Solve

However, in the conventional portable terminal apparatus, the linkage between the guide operation buttons and programs to be activated as well as the display colors of the guide operation buttons are allocated in a fixed manner. Such conventional structure cannot be applied to a portable terminal apparatus in which the activation of execution programs increased or decreased dynamically according to the taste of a user, the switching of tasks, the end of the execution programs and the like can be allocated to operation buttons "0"-"9". Also, it is also necessary that, besides the operation buttons (ten key) "0"-"9", one or more exclusive guide operation buttons should be provided separately on the main body of the portable terminal apparatus.

It is an object of the invention to provide a portable terminal apparatus and a program select method which, in an environment where two or more programs can be executed simultaneously, can dynamically link the activation of programs, the switching of the programs (tasks), the end of the programs and the like to operation buttons.

Means for Solving the Problems

A portable terminal apparatus according to the invention comprises: link information storage means for storing therein a linkage table containing information about the linkage between operation buttons to be selected and operated by a user and programs to be activated by the selective operation of the operation buttons; and, an activation program monitor part for dynamically monitoring the operation states of two or more programs activated at a terminal end.

Thanks to this structure, the two or more programs to be dynamically activated within the terminal can be linked to the operation buttons provided on the terminal, whereby switching to a program which a user wants to operate can be realized more easily through the selection of the operation button.

A portable terminal apparatus according to the invention has a structure that, according to a monitoring result obtained by the activation program monitor part, the backlight of the operation button linked to the program can be emitted.

Thanks to this structure, it is easy to select and operate an operation button corresponding to the operation state such as a state in which a program is under activation, a state in which the background is under operation, and a state waiting for an instruction.

Also, a portable terminal apparatus according to the invention has a structure that the button IDs of two or more operation buttons are allocated according to the rule of any one of the activating order of programs to be switched by the operation of the operation buttons, the order of the kinds of the programs, the order of the kinds of contents, and an order to be specified by a user.

Thanks to this structure, the two or more programs can be dynamically linked to the operation buttons to be depressed, whereby the switching of the tasks can be carried out easily through the selection of the operation buttons by the user.

Also, a portable terminal apparatus according to the invention has a structure that the backlights of the operation buttons are emitted in emitting light colors corresponding to the kinds of the programs or the kinds of the contents, or in an emitting light color specified by the user.

Thanks to this structure, the operation buttons corresponding to the kinds of the programs and the kinds of the contents can be specified clearly, thereby being able to prevent the wrong depression of the operation buttons.

Also, a portable terminal apparatus according to the invention has a structure that, in a program select mode for accepting the switching of the program under activation, the program can be switched or the operation of the program can be changed depending on the depressed state of the operation button, that is, depending on whether the operation button is depressed short or long.

In this structure, for example, when the operation button is depressed short, "switching of the program" is carried out and, when the operation button is depressed long, "end of the program" or "new creation of a mail" is executed, that is, the operation patterns of the programs can be allocated to the depressed states of the operation button, whereby the switching of the respective programs or the change of the operations of the respective programs can be carried out directly according to the depressed state of the operation button.

A portable terminal apparatus according to the invention has also a structure that the backlights of the operation buttons are emitted in light emitting patterns corresponding to the kinds of the operations of the respective programs.

Thanks to this structure, according to the light emitting patterns of the backlights, the operation states of the programs can be grasped more easily, which can enhance the operation efficiency of an operation key further.

A portable terminal apparatus according to the invention includes an operation button with a program switching function allocated thereto; and, a control part for controlling the switching of the program through the operation of the present operation button.

Thanks to this structure, each time the operation button is depressed short or long, the program can be switched, which makes it possible to display a desired program menu easily.

A program select method according to the invention comprises the steps of: previously storing a linkage table containing information about the linkage between operation buttons to be selected by a user and programs to be activated by the selection of the operation buttons in link information storage means; and, dynamically monitoring the operation states of two or more programs activated at a terminal end using an activation program monitor part.

Also, a program select method according to the invention is a method in which, when two or more programs are activated, according to the monitoring result obtained by the activation program monitor part, the backlights of the operation buttons linked with the activated programs are emitted.

Effects of the Invention

According to the invention, there can be provided a portable terminal apparatus which can provide the following effect: that is, a linkage table showing the linkage between operation buttons to be selectively operated by a user and programs to be activated through the operation of such operation buttons is stored in link information storage means, and the operation states of two or more programs activated at a terminal end are dynamically monitored by an activation program monitor part, whereby two or more programs to be dynamically activated within the terminal can be linked to operation buttons provided on the terminal and thus the selection of the programs can be facilitated through the selection of the operation buttons.

BRIEF DESCRIPTION OF THE DRAWINGS

FIG. 6 is a table view of a task table to be provided in link information storage means according to the invention.

FIG. 7 is a table view of a program table to be provided in the link information storage means according to the invention.

FIG. 8 is a table view of a button allocating table according to a rule provided in the link information storage means according to the invention.

FIG. 9 is a table view of a button light emitting color allocating table according to the kinds of programs provided in the link information storage means according to the invention.

FIG. 10 is a table view of an operation allocating table according to the kinds of programs provided in the link information storage means according to the invention.

FIG. 11 is a table view of a light emitting pattern allocating table according to the kinds of programs provided in the link information storage means according to the invention.

DESCRIPTION OF REFERENCE NUMERALS

1: Portable terminal apparatus
2: Operation button
4: Button light emitting part
6: Display (Display part)
12: Link information monitor part
14: Link information recording means

DETAILED DESCRIPTION

Now, description will be given below of a portable terminal apparatus according to the invention with reference to the accompanying drawings.

Figure 1:
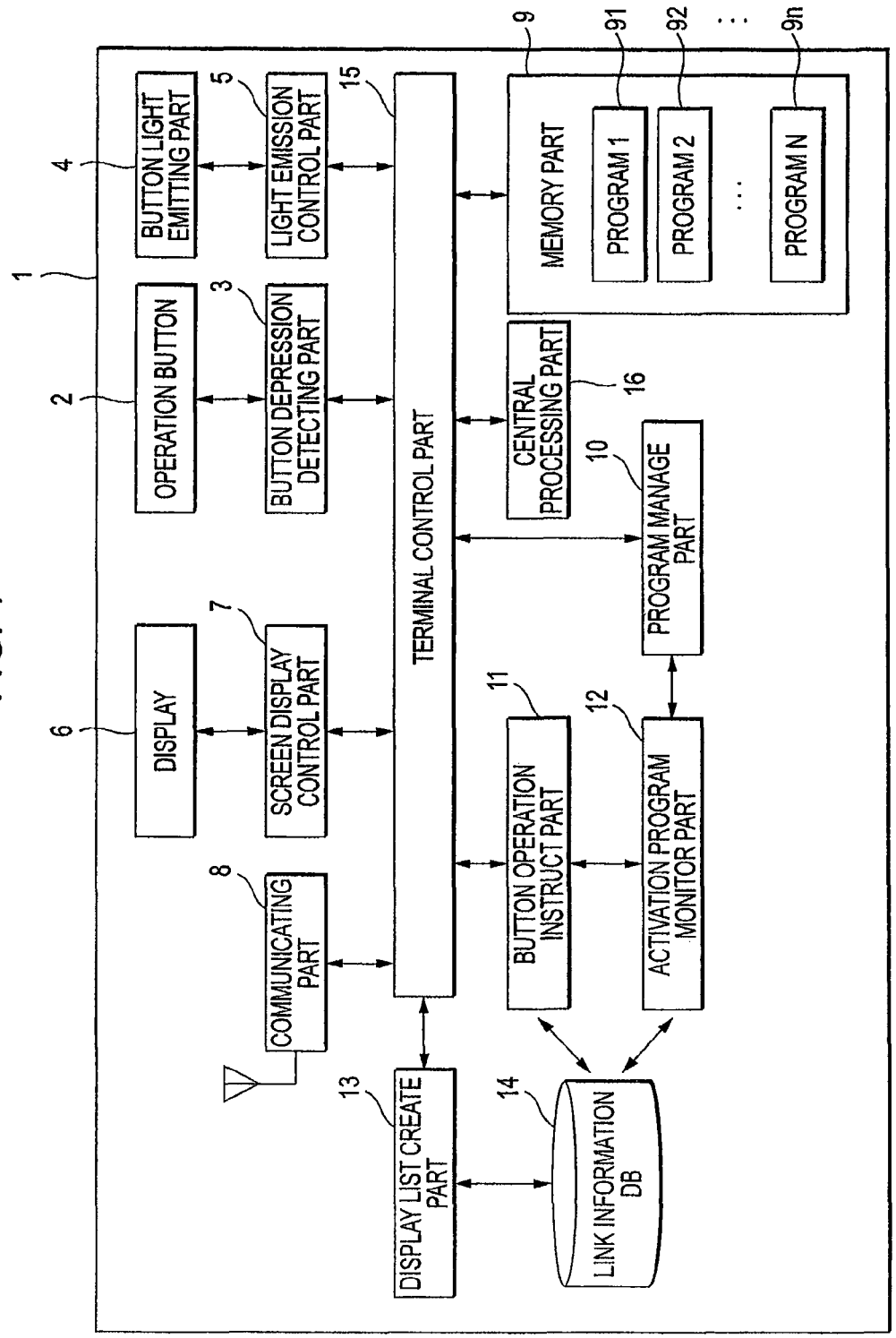
FIG. 1 is a block diagram of a portable terminal apparatus according to an embodiment of the invention.

FIG. 1 shows a portable terminal apparatus according to an embodiment of the invention.

In FIG. 1, a portable terminal apparatus 1 includes operation buttons (ten key) 2, for example, "0"~"9" buttons, a button depression detecting part 3, a button light emitting part 4, a light emission control part 5, a display 6, a screen display control part 7, a communicating part 8, a memory part 9, a program manage part 10, a button operation instruct part 11, an activation program monitor part 12, a display list create part 13, a link information data base 14, a terminal control part 15, and a central processing unit 16.

As the operation buttons 2, besides the ten key, there are used a function key and a side key which have been previously provided; and, instructions such as the activation and input of a program specified by a user are input to the terminal control part 15 through the button depression detecting part 3.

The button light emitting part 4 allows a given one of the operation buttons 2 to emit the light in a color through the light emission control part 5. This button light emitting part 4 is composed of a light emitting diode or the like. The light emitting part 4 functions as the backlight to illuminate the operation button 2 so that the specification of the operation button 2 can be facilitated.

As regards the display 6, in an environment capable of simultaneous execution of two or more programs on a terminal, the display 6 displays, for example, three activated browsers windows and one activated mail software window on the same screen through the screen display control part 7, or displays one selected program in the full space of the screen.

The communicating part 8 includes an antenna and, under the control of the terminal control part 15, transmits and receives radio waves of a given frequency band to and from a key station.

The memory part 9 stores therein not only a program for the terminal control part 15 and a program for carrying out functions built in the portable terminal apparatus 1 but also two or more programs 91~9n such as programs for browsers, mail software, transceivers and televisions.

The program manage part 10 manages the programs 91~9n stored in the memory part 9, while the button operation instruct part 11 gives an instruction for the light emission of the button light emitting part 4 and an instruction for the short and long depressing operations of the operation buttons 2. The activation program monitor part 12 functions to monitor dynamically the operating conditions of the two or more programs which are to be activated on the terminal.

The display list create part 13 functions to create a list of two or more programs to be displayed on the display 6 in such a manner that the programs are rearranged according to a rule such as a rule based on their activating order.

The link information data base 14 stores therein a linkage table in which the button numbers (button ID) of the operation buttons are linked to programs which can be activated by operating the operation buttons 2. Further, in the link information data base 14, there are also stored the emitting light colors of the button light emitting part 4 corresponding to the programs, the light emitting patterns of the button light emitting part 4, and operations corresponding to the depressed states of the operation buttons 2, while they are arranged in a table.

The terminal control part 15 generally controls the respective parts of the portable terminal apparatus by controlling a given program. The central processing unit 16 controls the terminal control part 15.

Figure 2:
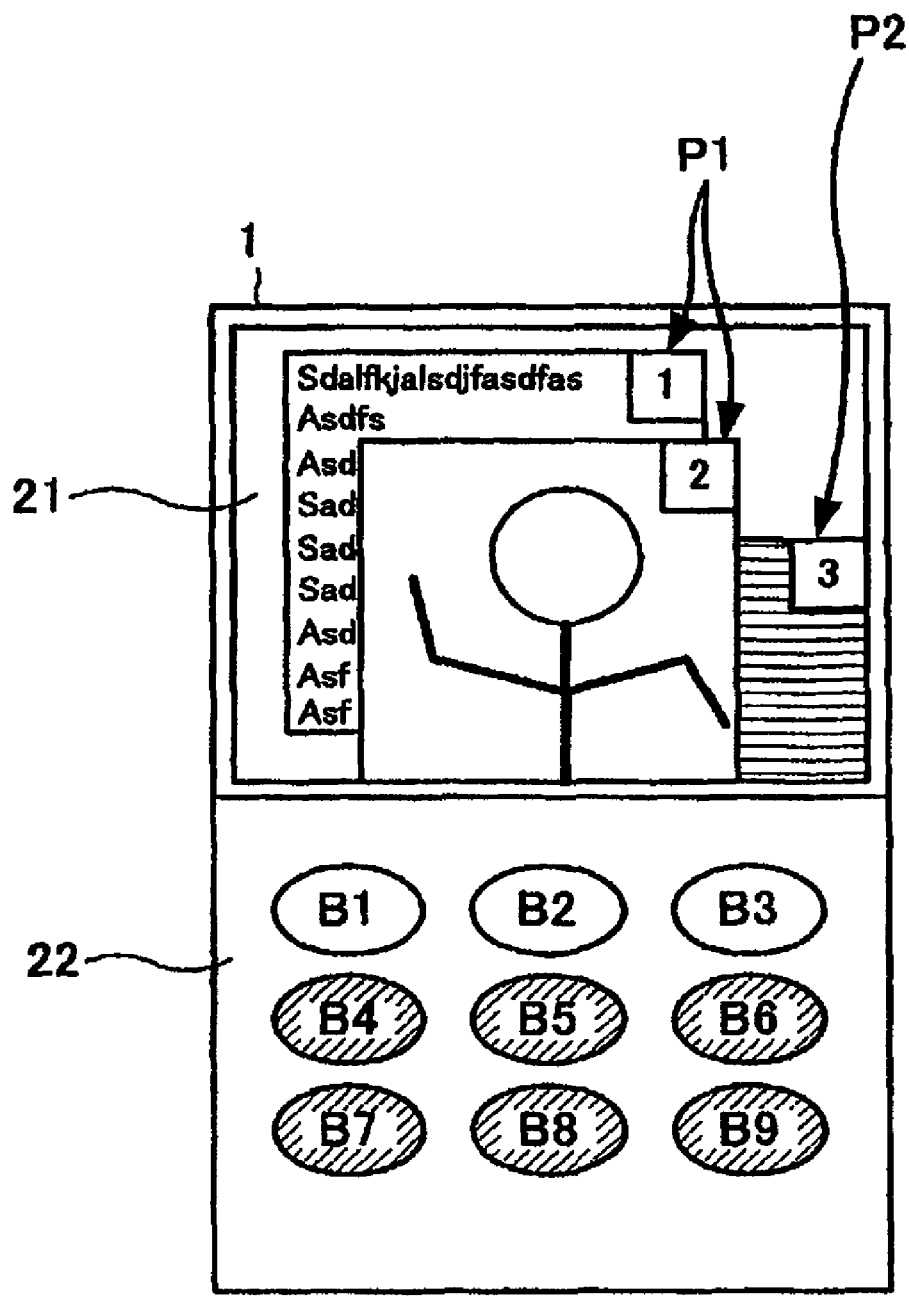
FIG. 2 is an external view of the portable terminal apparatus shown in FIG. 1.

Next, description will be given below of the structures of the display part 21 and operation part 22 of the portable terminal apparatus 1 with reference to FIG. 2. On the display part 21, as shown in FIG. 2, there are dynamically displayed application programs such as browsers in an area for displaying an animation, a static image, a character and the like.

On this display part 21, there are displayed, for example, two windows for the two browsers of a program ID [P1] and one window for a piece of mail software of a program ID [p2]; and, to these windows, there are given numbers according to the activating order thereof.

On the operation part 22, there are provided operation buttons (ten key) B1~B9 and, to each of the operation buttons B1~B9, there can be allocated a program. For example, when a program is allocated to the operation buttons B1~B3, by depressing one of these buttons, the allocated or corresponding program can be selected.

By the way, the operation buttons B1~B9 are also buttons which are used to input numeric values and kana characters. These operation buttons B1~B9 correspond to the operation buttons 2 shown in FIG. 1 and can be respectively illuminated in blue, green, yellow, red and other colors by the button light emitting part (light emitting diode) 4 which serves as the backlights of the operation buttons.

Also, depending on the depressed states of the operation buttons B1~B9, that is, depending on whether they are depressed short or long, they can be linked to the operations of the programs. For example, when the operation button that is allocated to the browser is pressed down for a short time, the processing is switched over to the browser; and, for the long depression of the operation button, the browser is ended. Also, when the operation button allocated to the mail software, the processing is switched over to the mail software; and, for the long depression of the operation button, in the mail software, there is executed an operation to create a new mail. This can reduce the number of operations of the operation buttons by the user, whereby the convenience of the portable terminal apparatus 1 can be enhanced.

Figure 3:
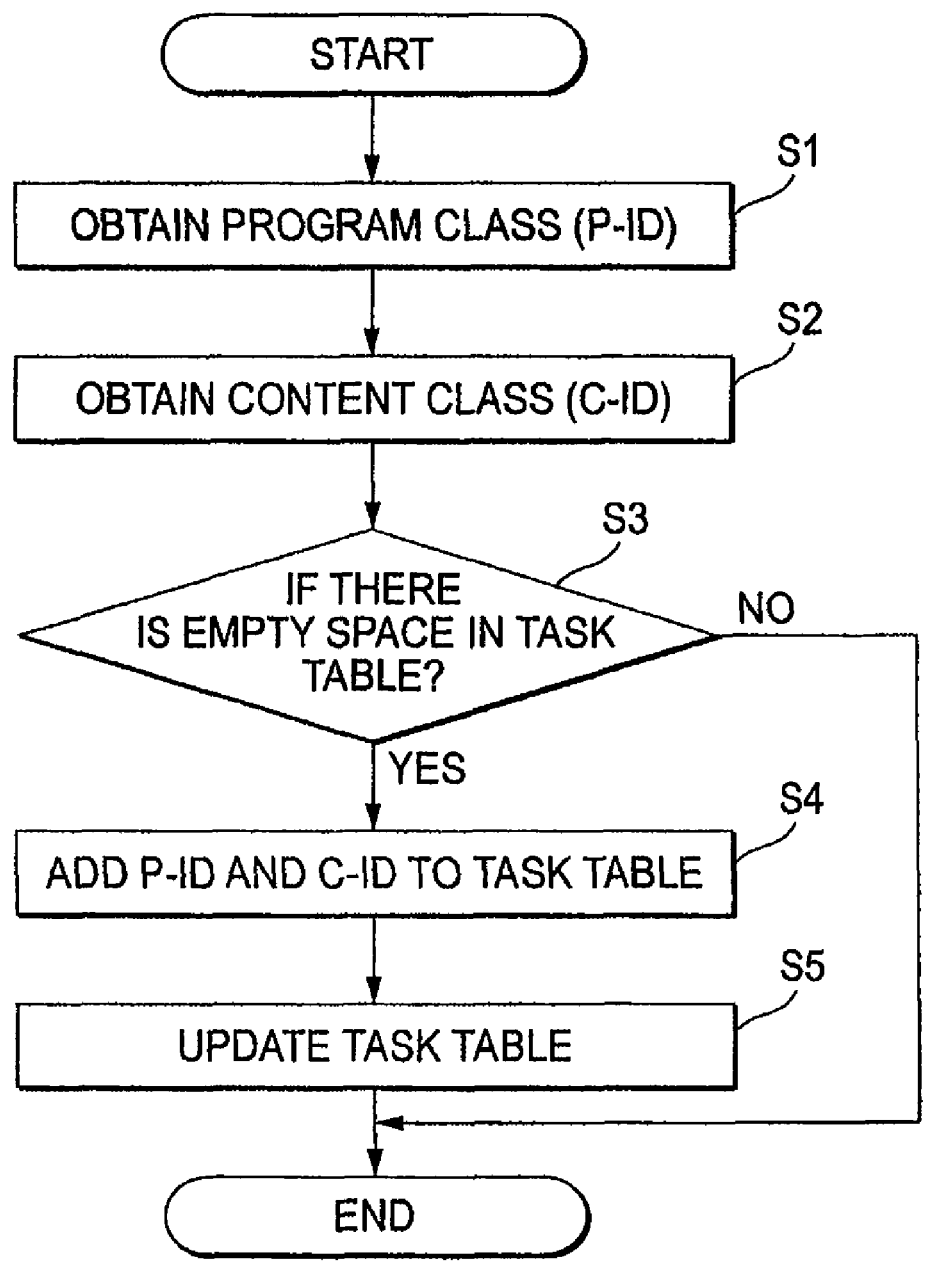
FIG. 3 is a flow chart of a task table update procedure when activating a program according to the invention.

Now, FIG. 3 is a flow chart of a task table updating procedure when the above-mentioned program is activated. According to the present flow chart, when activating the program, there is obtained a program class (P-ID) (Step S1) and a content class (C-ID) is obtained (Step S2); and, after then, it is checked whether there is present an empty space in the task table or not (Step S3).

When there exists an empty space in the task table, the program class (P-ID) and content class (C-ID) are added to the task table (Step S4), and the task table is thereby updated (Step S5). Also, when there exists no empty space in the task table, the task table is not updated but the processing waits for the next operation.

Figure 4:
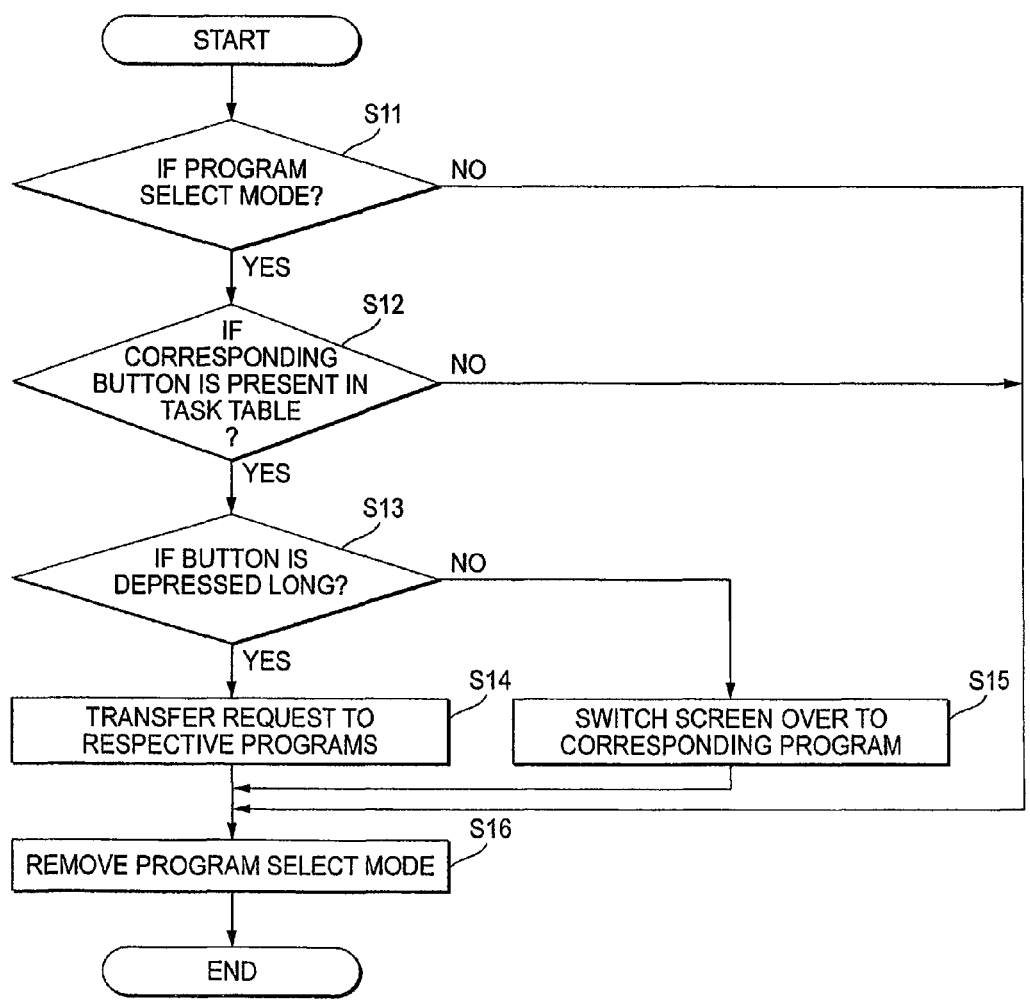
FIG. 4 is a flow chart of a program operating procedure when pressing down an operation button according to the invention.

Now, FIG. 4 is a flow chart of a program operation procedure when the operation buttons B1~B9 are depressed. Here, firstly, it is checked whether the current mode is a program select mode or not (Step S11). When it is the program select mode, it is checked whether there exists an operation button linked to the task table or not (Step S12).

When the operation button linked to the task table exists, it is checked whether the pressed state of the operation button is a short pressed state or a long pressed state (Step S13); and, for the long pressed state, a request such as a program end is transmitted to the respective programs (Step S14) to thereby remove the "program select mode" (Step S16). Also, for the short pressed state, the screen is switched over to a corresponding program (Step S15).

Figure 5:
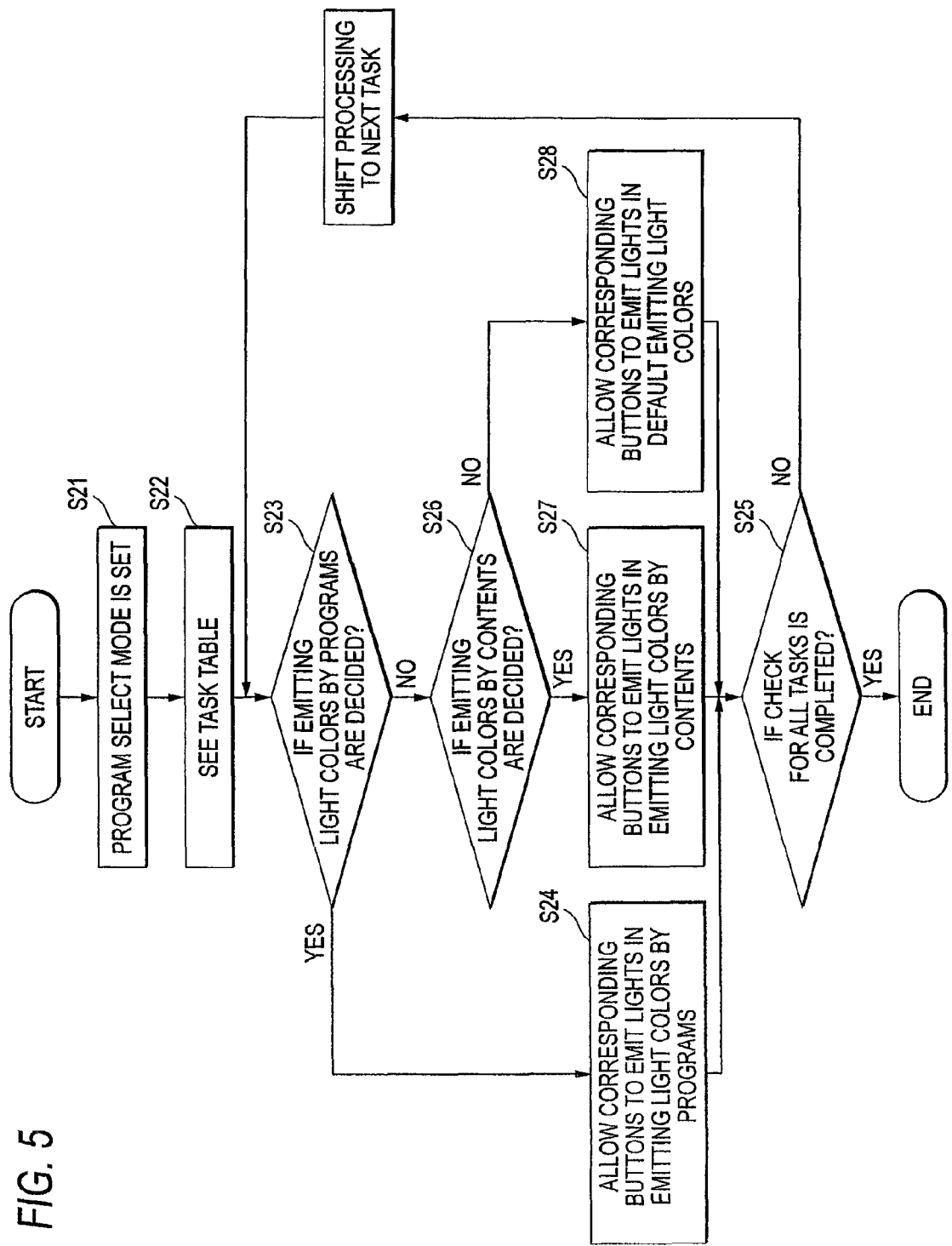
FIG. 5 is a flow chart of an emitting light color deciding procedure when a button light emitting part emits a light according to the invention.

Now, FIG. 5 is a flow chart of a task check procedure when the operation buttons B1~B9 emit lights. Here, when the current mode is a program select mode (Step S21), the task table is referred to (Step S22), and it is checked whether the emitting light colors of the button light emitting part 4 by programs are decided or not (Step S23).

When the emitting light colors are decided, the corresponding operation buttons 2 are allowed to emit lights in emitting light colors by programs (Step S24) and it is checked whether the check of all tasks is completed or not (Step S25). When the check of all tasks is completed, the task check processing is ended; and, when it is not completed, the processings in Step S23 and in its following steps are executed again.

On the other hand, when the emitting light colors by programs are not decided, it is checked whether emitting light colors by contents are decided or not (Step S26). When the emitting light colors by contents are decided, the corresponding operation buttons 2 are allowed to emit lights in emitting light colors by contents (Step S27), and the processing goes to Step S25.

However, when the emitting light colors by contents are not decided, the corresponding operation buttons are allowed to emit lights in previously determined standard emitting light colors (Step S28), and the processing goes to Step S25. And, when it is judged in Step S25 that the check of all tasks is completed, the processing goes to the next task, where the processings in Step S23 and in its following steps are executed again (Step S29).

Next, description will be given below of a case in which a program is selected and executed using the above-structured portable terminal apparatus 1. When two or more programs are activated simultaneously according to the taste of a user, for example, as shown in FIG. 2, there are displayed, on the display part 21, two browser windows and one mail software window.

Also, the button light emitting part 4 of the operation buttons 2 corresponding to these windows turn on. The user selects and depresses any one of the operation buttons 2 which corresponds to a program such as a browser and mail software displayed on the display part 21.

In response to this, a browser or mail software, which is stored in the link information data base 14 while it is linked to the button ID of the selected and depressed operation button 2, is selected and thus the window for the selected browser or mail software can be operated on the display part 21. The program for which the operation button 2 is not pressed down is background displayed or is held in a display state waiting for an instruction.

In this manner, when two or more programs are activated, according to the dynamic monitor result obtained by the activation program monitor part 12, the button light emitting part (backlight) of the operation button linked to the activated program is turned on to thereby be able to facilitate the selection of the program by the user.

Next, description will be given below of an example of a table to be stored in the above-mentioned link information storage means 14 with reference to FIGS. 6 to 14. FIG. 6 is a task table to be used when two or more programs are dynamically linked to the operation buttons to be depressed; and, [B1], [B2], [B3] of the button ID and [P1], [P2], [P3] of the program ID shown in FIG. 2 are linked to [1], [2], [3] of the task ID respectively.

Here, the term "task" means a program which corresponds to each of the windows that are switched by a user pressing down the operation buttons; and, it may sometime include an ordinary task in a program operation environment.

In this task table, there are set the button ID (B-ID) and program ID (P-ID) that correspond to the task ID (T-ID). By the way, the number of tasks to be allocated does not depend on the number of the operation buttons 2. Also, the operation button ID to be allocated may be not only a numeric button but also a cross button, a function button, a side button and the like.

FIG. 7 is a program table in which the program IDs are linked to the kinds of programs; and, for the [P1], [P2], -[Pn] of the program ID, there are provided browsers and mail software in such number that corresponds to the number of programs to be operated in a terminal.

FIG. 8 is a task table in which the button IDs are allocated according to a rule such as the activating order of the tasks. Here, the operation buttons [B1], [B2], and [B3] are linked to the task [2], task [3], and task [11] in their activating order according to the rule. By the way, the rule may be based on the sequence of the kinds of the programs or contents, or may be based on the order that is specified by a user.

FIG. 9 is a program table in which the kinds of the programs are linked to the emitting light colors of the button light emitting part 4. For example, [P1] of the program ID is a browser, and the emitting light color is "green"; and, [P2] of the program ID is mail software, and the emitting light color is "blue". By the way, the emitting light color may be previously set in a terminal, or may be decided by specifying colors in an HTML tag, that is, using information stored in the contents, or may be set by a user herself or himself according to the taste of the user.

FIG. 10 is a program table in which the kinds of the programs are linked to the operations of the programs to be executed depending on the emitting light colors of the button light emitting part 4 and on the depressed states of the operation buttons 2. Here, [P1] of the program ID is a browser, and the emitting light color is "green"; and, for the short depressed state of the operation button 2, it corresponds to the "switching" of the browser, and, for the long depressed state, it corresponds to the "end" of the browser.

The term "state change" of the messenger (IMPS) in FIG. 10 means the presence information that expresses the current state of a user. For example, by pressing down the operation button long, the present presence information can be changed sequentially in such a manner that online→during eating→during meeting→online one after another.

FIG. 11 is a program table in which the kinds of the programs, the operations of the programs and the light emitting patterns are linked to each other. Here, [P1] of the program ID is a browser, and, in correspondence to the operation kinds "waiting for reading" and "page update occurring time", the light emitting patterns are set for "turn-on" and "blinking", respectively. By the way, such turn-on and blinking are just an example of the light emitting pattern in order to facilitate the discrimination of the operation button and thus there may also be employed another light emitting pattern.

Figures 12, 13:
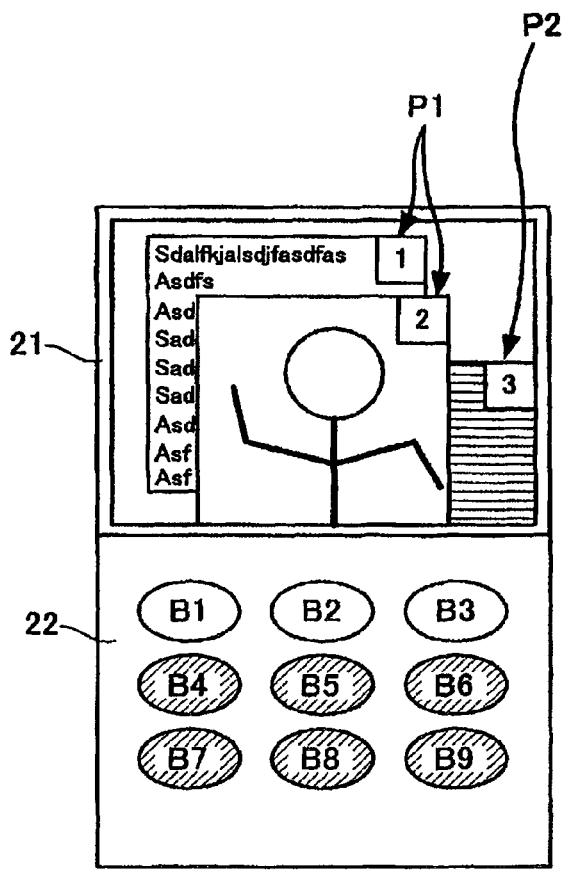
FIG. 12 is a table view of a task table with contents by kinds added thereto provided in the link information storage means according to the invention.
FIG. 13 is another external view of the portable terminal apparatus shown in FIG. 1.

FIG. 12 is a task table in which the button IDs of the operation buttons are allocated to the content IDs; and, specifically, the contents IDs [C1], [C2] and [C5] are linked to the button IDs [B1], [B2] and [B3], respectively. FIG. 13 shows the contents of the programs [P1] and [P2] that are displayed on the display part 21 at the then time.

Figures 14, 15:
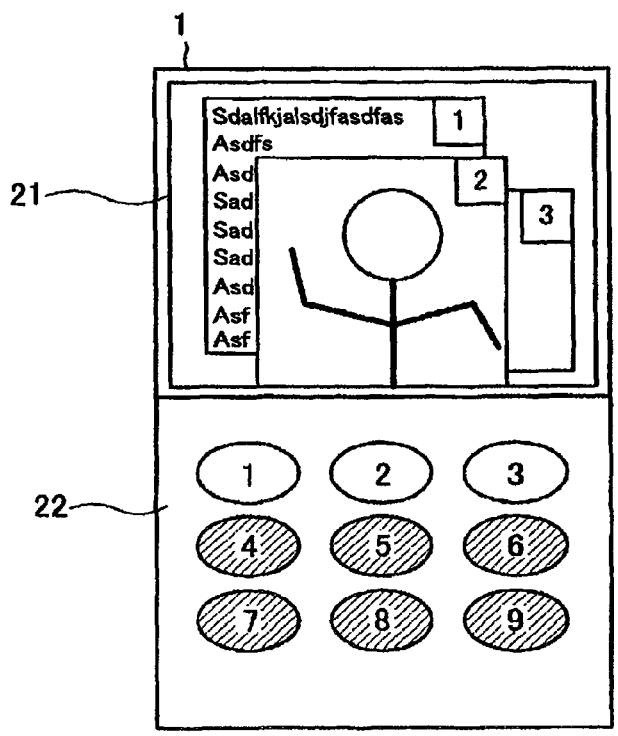
FIG. 14 is a table view of a content-by-class table provided in the link information storage means according to the invention.
FIG. 15 is a general view of a window-type display example of a program in a portable terminal apparatus.

FIG. 14 is a content table in which the kinds of the contents by the above-mentioned content IDs are linked to the emitting light colors of the operation buttons [B1], [B2] and [B3], respectively. Here, for example, when the content ID linked to the program [P2] displayed on the display part 21 is [C5], the "charge" for a pay TV is regarded as the class of the content and is linked to the emitting light color "red". This "red" color is also used as a color to warn a user that there has occurred a burden for the user to pay and, as the need arises, the color "yellow" can also be used instead of the color "red".

As the kinds of the contents, there are available character string system contents, image system contents, chat system contents, contents involved with a time limit, and contents involved with the above-mentioned "charge". When judging the kinds of the contents, the judgment is made on the assumption that the contents are general contents which are exchanged in the HTTP communication and the like. However, factors for the judgment of the contents kinds are not limited to the above assumption, but there may also be used, for example, the information contained in the contents.

By the way, the emitting light colors can be previously set in a terminal, or can be decided according to the information that is stored in the contents, or can be set by a user herself or himself according to the taste of the user.

Now, FIGS. 15 to 18 are respectively the general views of the display examples of the portable terminal apparatus 1 in which a user can specify the allocation of the operation buttons corresponding to the programs, and the user can reserve such allocation and can call such allocation at user's desired timing.

FIG. 15 shows an example of the program window display on the display part 21 of the portable terminal apparatus 1. Here, there are displayed numbers on the windows respectively linked to the programs in the order where the programs are activated, while these numbers are linked to the operation buttons [1], [2] and [3] in the operation part 22.

Figure 16:
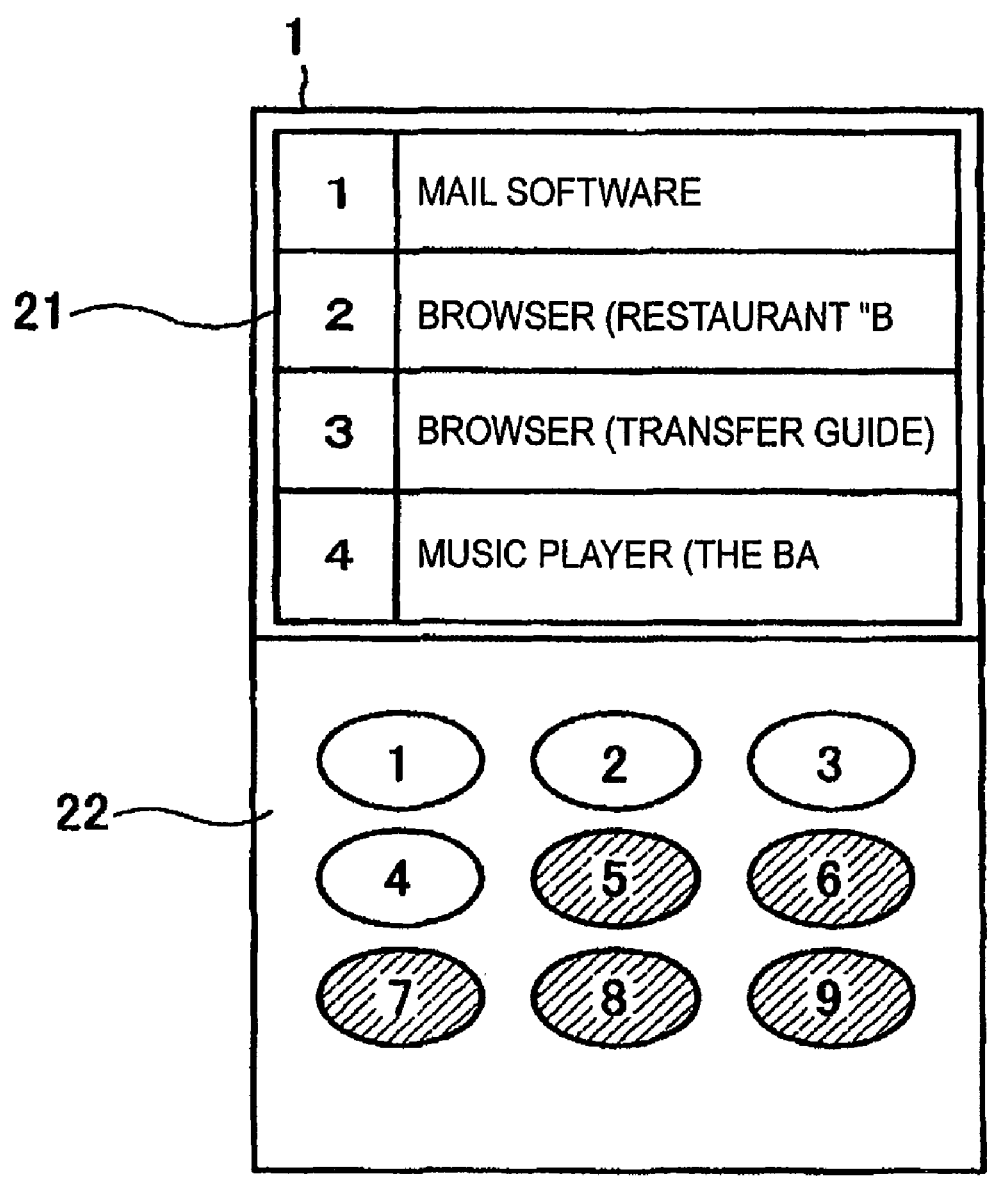
FIG. 16 is a general view of a list-type display example of a program in a portable terminal apparatus.

FIG. 16 is a display list in which the kinds of the programs to be displayed in FIG. 15 (mail software, a browser (a restraint), a browser (transfer guide), and a music player are arranged and displayed in their activating order, while numbers given to these kinds are linked to the operation buttons [1]~[4], respectively.

By the way, in FIG. 15, when the positions of the windows are changed by the user, the numbers of the programs shown in FIG. 16 are given again sequentially so as to follow such change.

Figure 17:
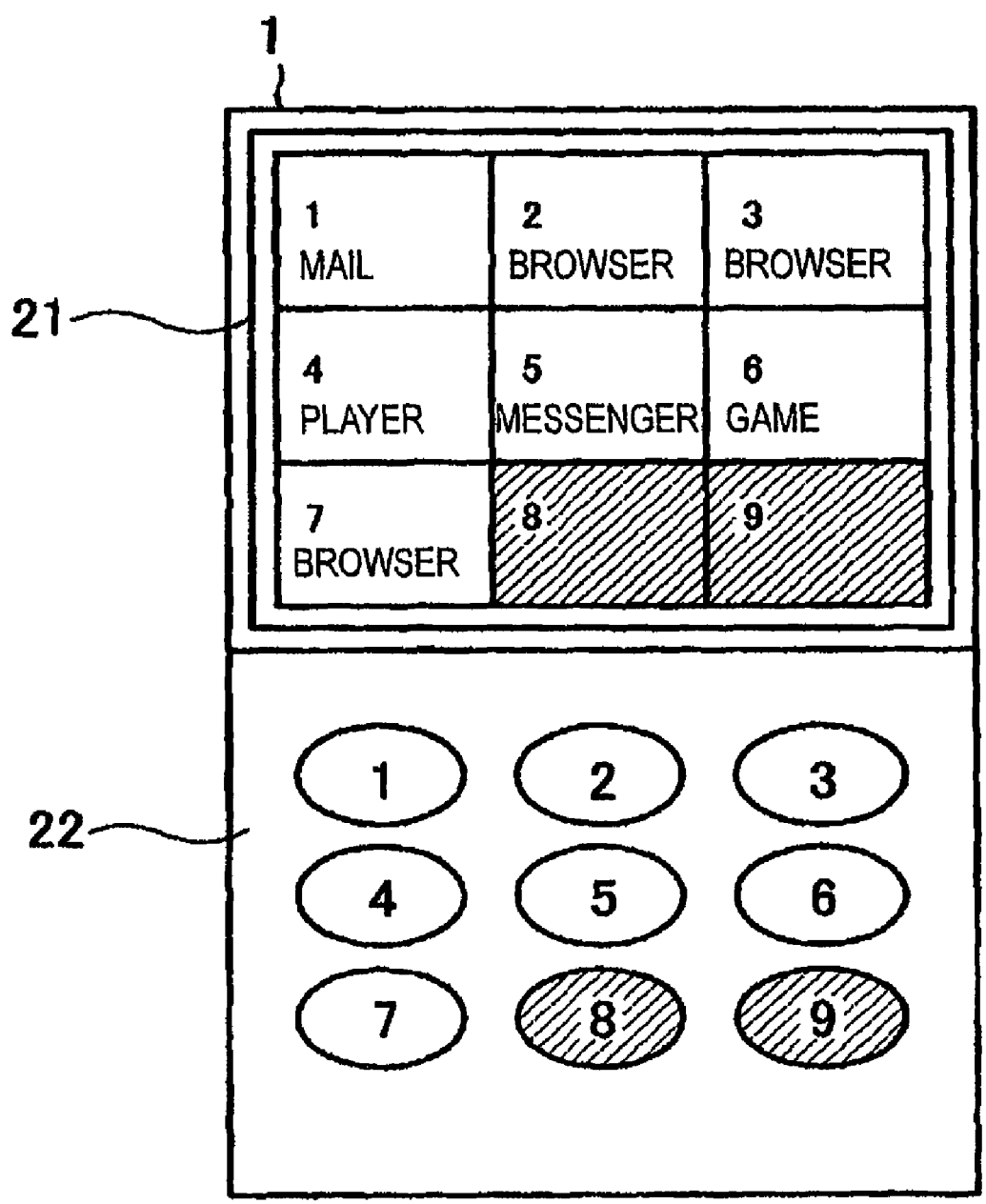
FIG. 17 is a general view of a matrix-type display example of a program in a portable terminal apparatus.

FIG. 17 is a general view of a matrix-type display example of a portable terminal apparatus 1, in which the select candidates of programs to be displayed on the display part 21 are displayed in a matrix of 9 squares in correspondence to the arranged portions of the operation buttons of the operation part 22. In FIG. 17, selectable programs are allocated to operation buttons [1]~[7], respectively. Also, a program display screen to urge the user to select the above-mentioned programs can also be displayed immediately by operating the side button provided on the terminal.

Figure 18:
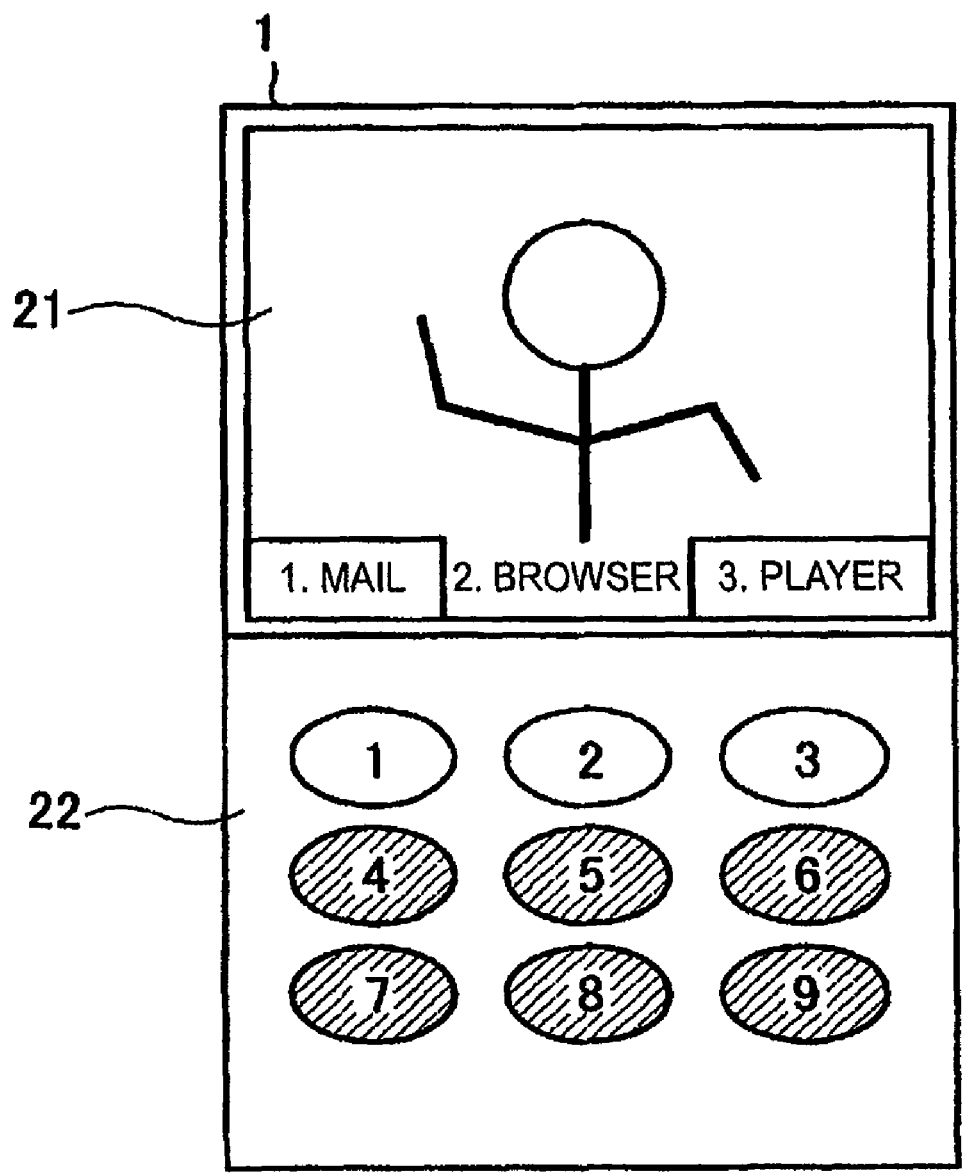
FIG. 18 is a general view of a tag-type display example of a program in a portable terminal apparatus.

FIG. 18 is a general view of a display example of the portable terminal apparatus 1, showing a tag-type display in which numbers are applied on tags displayed on a program corresponding screen in the program activating order, and the numbers applied on the tags are linked to operation buttons [1], [2] and [3] provided on the operation part 22.

Figure 19:
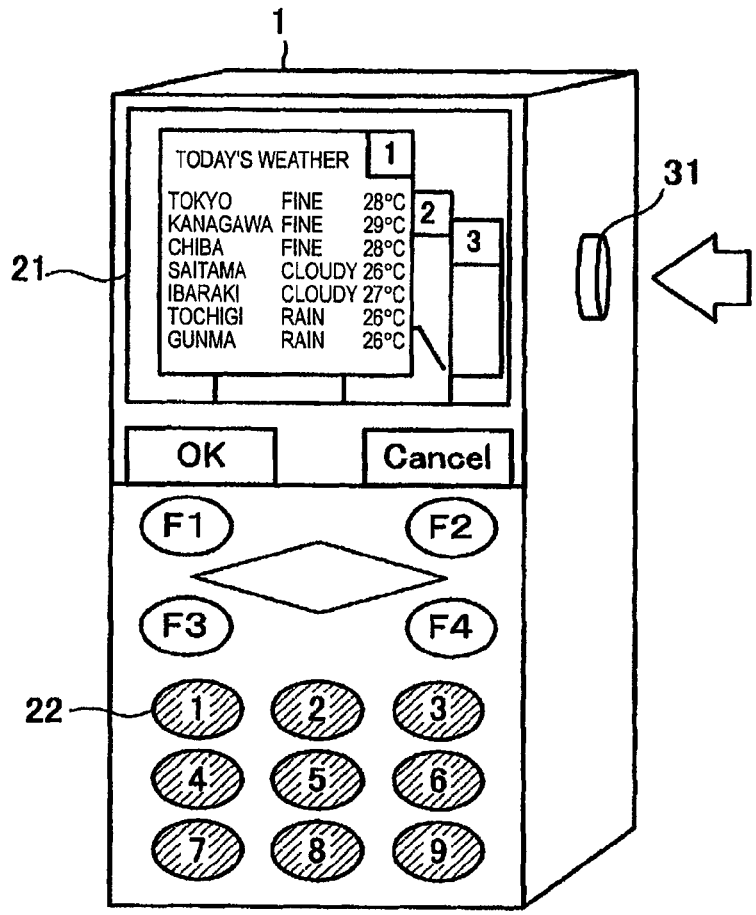
FIG. 19 is another external view of the portable terminal apparatus shown in FIG. 1.

FIG. 19 is an external view of a portable terminal apparatus 1 which can realize a simple program (task) switching operation using an operation button allocated. Specifically, to the input device such as a button or a lever provided on the side surface of the portable terminal 1, here, to an operation button 31, there is allocated a program (task) switching function which selects and displays programs, which can be activated, according to the order of the list of these programs list. This operation button may be provided in any position, however, it should be provided in other position than that of an operation button to which is allocated the role of the shutter of a camera or the like.

Figure 20:
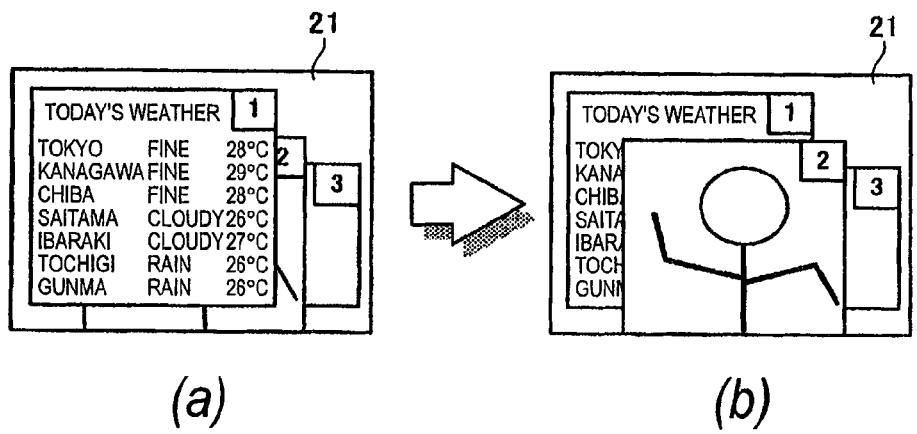
FIG. 20 is an explanatory view of a program (task) switching state when an operation button is depressed short.
Figure 21:
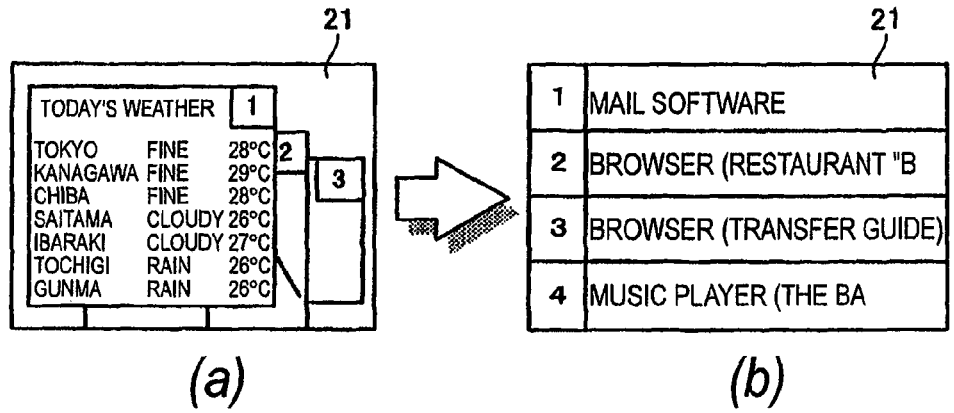
FIG. 21 is an explanatory view of a switching state to a program select menu.
Figure 22:
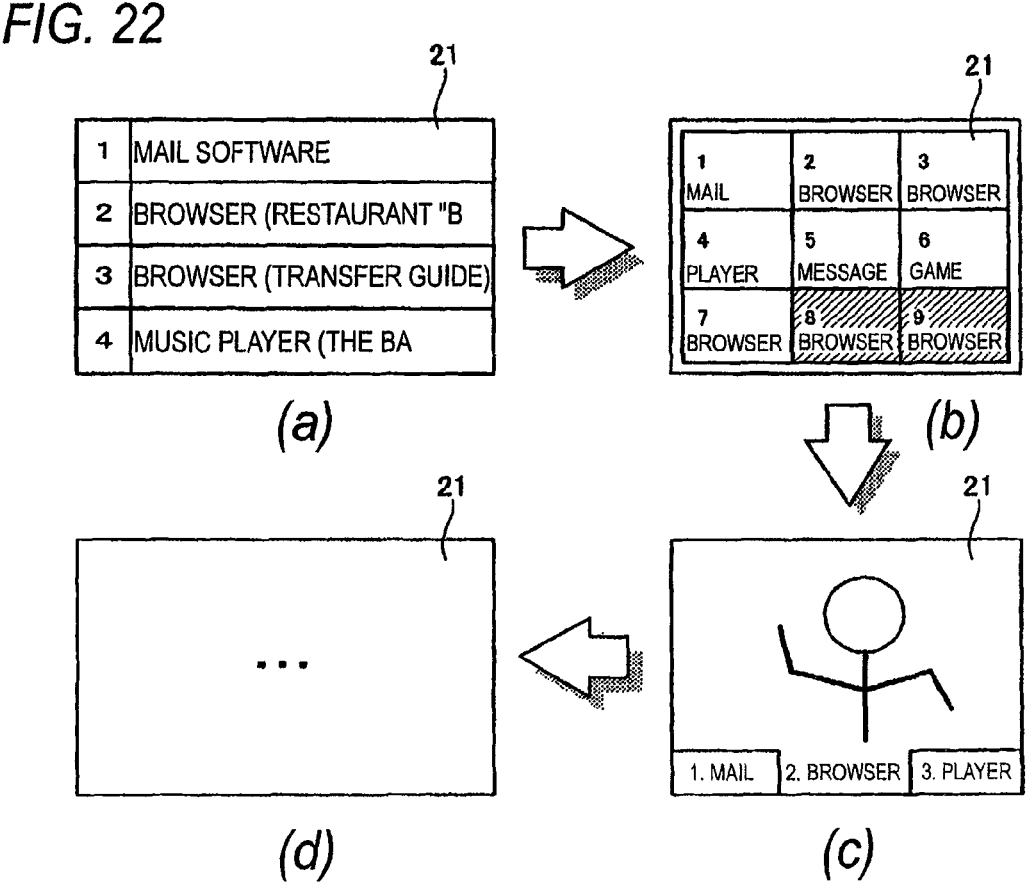
FIG. 22 is an explanatory view of a program select menu switching state when an operation button is depressed long.

Thanks to provision of such operation button 31, for example, as the display is switched from FIG. 20A to FIG. 20B, each time the operation button 31 is depressed short, a next candidate program can be selected and displayed on the display part 21. On the other hand, when the operation button 31 is depressed long, as can be seen from FIG. 21A to FIG. 21B, the display screen can be switched over to a program select menu.

Also, by repeating the depression of the operation button 31, as can be seen in FIGS. 22A, 22B, 22C, -22(n), the program select list display can be changed to a program select menu display, a tag display and the like one after another. By the way, in the above description, there has been shown an example in which the program select menu is displayed by depressing the operation button 31 repeatedly. However, it is also possible to employ other display means such as means (1) for displaying the program select menu by depressing the operation button short, means (2) for displaying the program select menu from a user menu, and means (3) for displaying the program select menu at the timing for receiving a message.

Figure 23:
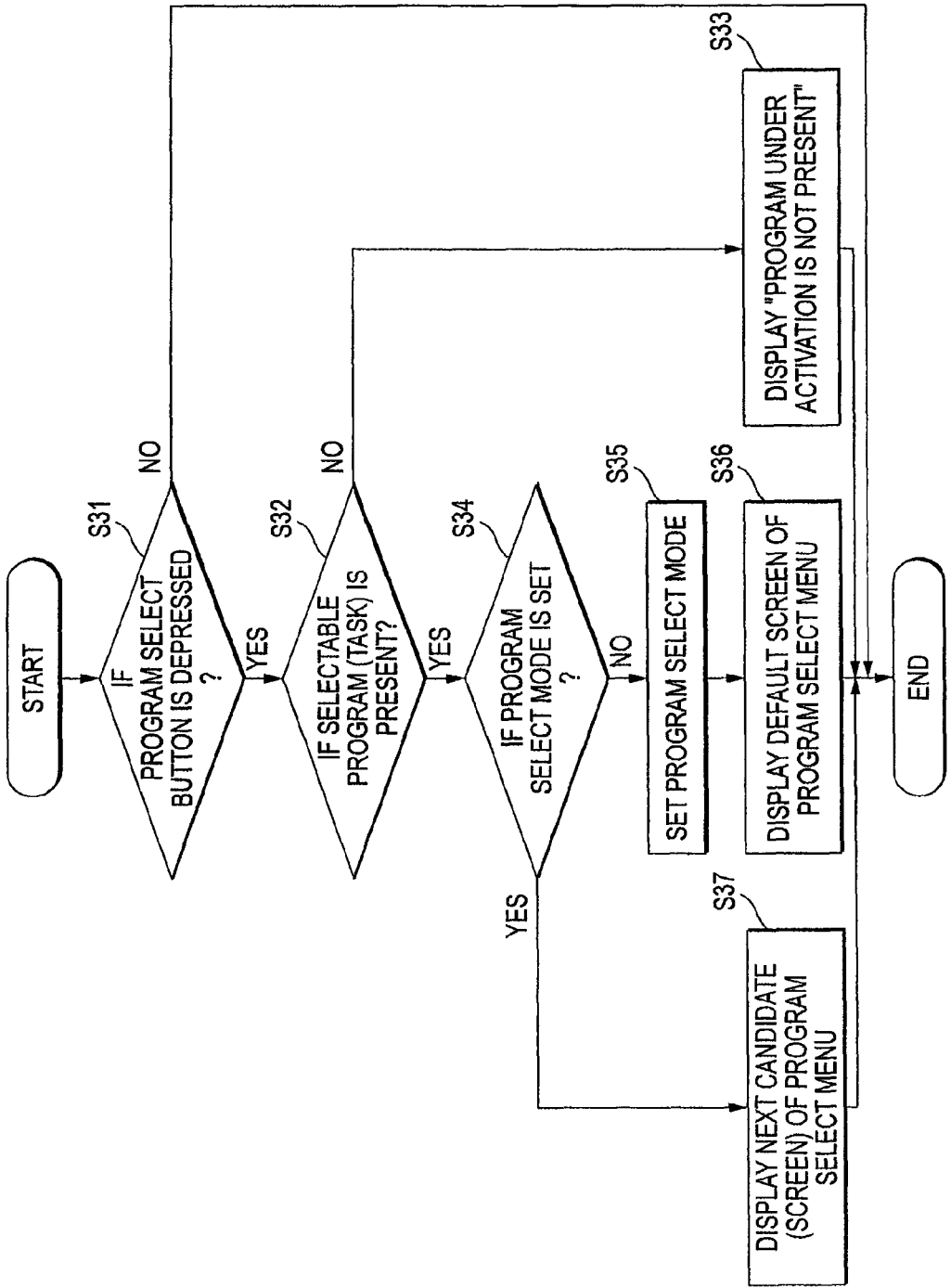
FIG. 23 is a flow chart of a procedure for switching the display method of a program select menu.

FIG. 23 shows the procedure for switching the display method of the program select menu using the depression of the program select button.

In FIG. 23, firstly, it is checked whether the program select button is depressed or not (Step S31). When not depressed, no processing is executed. On the other hand, when it is found that the program select button is depressed, it is checked whether there exists a selectable program (task) or not (Step S32). When it is found that such program does not exist, there is displayed a message "a program under activation is not present", thereby ending the processing (Step S33).

However, when a selectable program is present, it is checked whether a program select mode is set or not (Step S34). When not set, there is set the program select mode (Step S35). Next, the default screen of the program select menu is displayed (Step S36) and, after then, the processing is ended. Also, when it is found in Step S34 that the program select mode is set, the program select menu is switched over to the next candidate (screen) in a previously decided order and the next candidate (screen) is displayed (Step S37).

Figure 24:
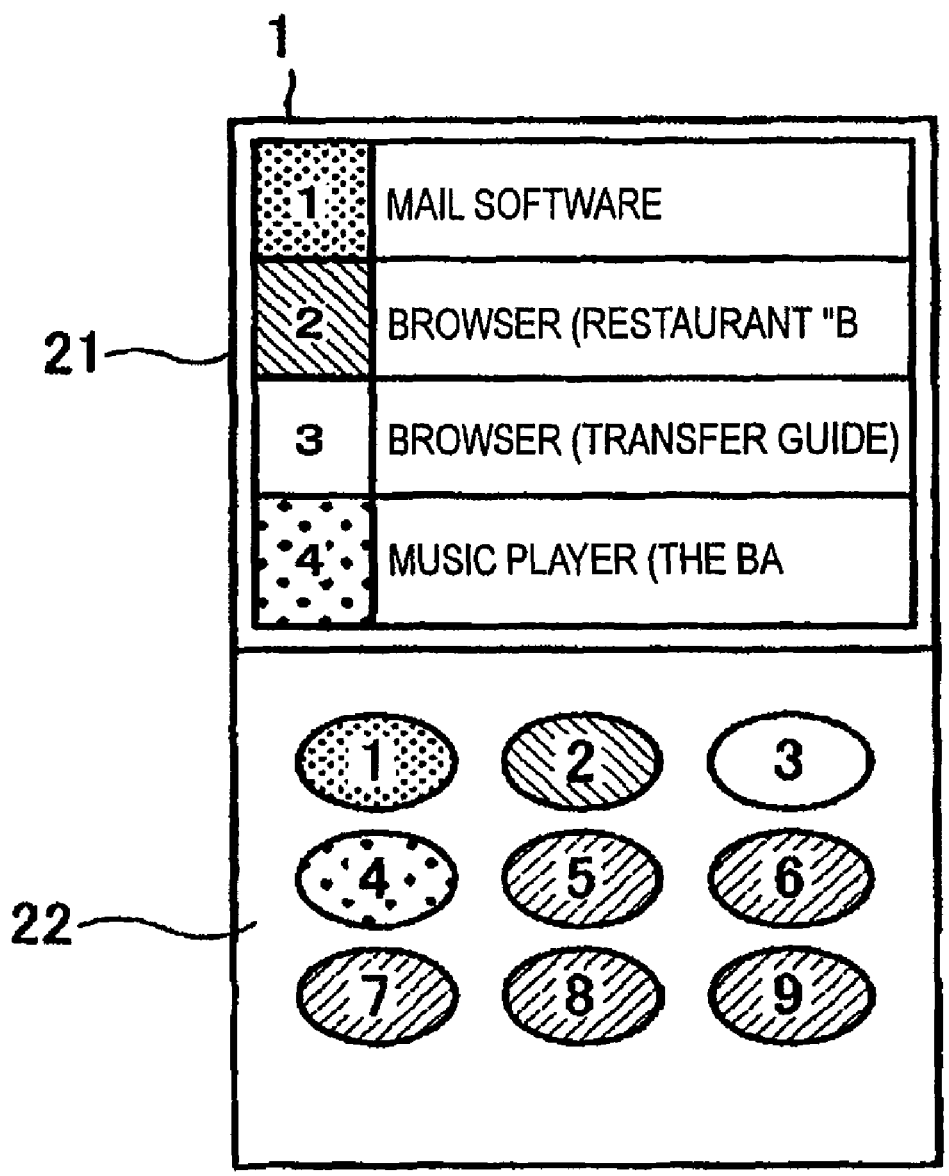
FIG. 24 is an explanatory view of a state in which an operation button and a display menu are allowed to emit the light in the same color.

FIG. 24 shows a menu in which the kinds of the programs, that is, mail software, a browser (restaurant), a browser (transfer guide), and a music player are displayed while they are arranged in the order of activation; numbers given to these kinds are linked to the operation buttons respectively; and, the operation buttons [1]-[4] are allowed to emit lights in the same colors as the arranged colors of the menu.

According to this menu, since the arranged colors of the menu switchingly displayed are coincident with the emitted light colors of the operation buttons [1]~[4] corresponding to these menu arranged colors, there is eliminated a possibility that the operation buttons [1]~[4] can be depressed wrong, so that a user can select the menu more easily and more positively. In this case, when two or more programs are activated, further different colors may be allocated to such programs.

Figure 25:
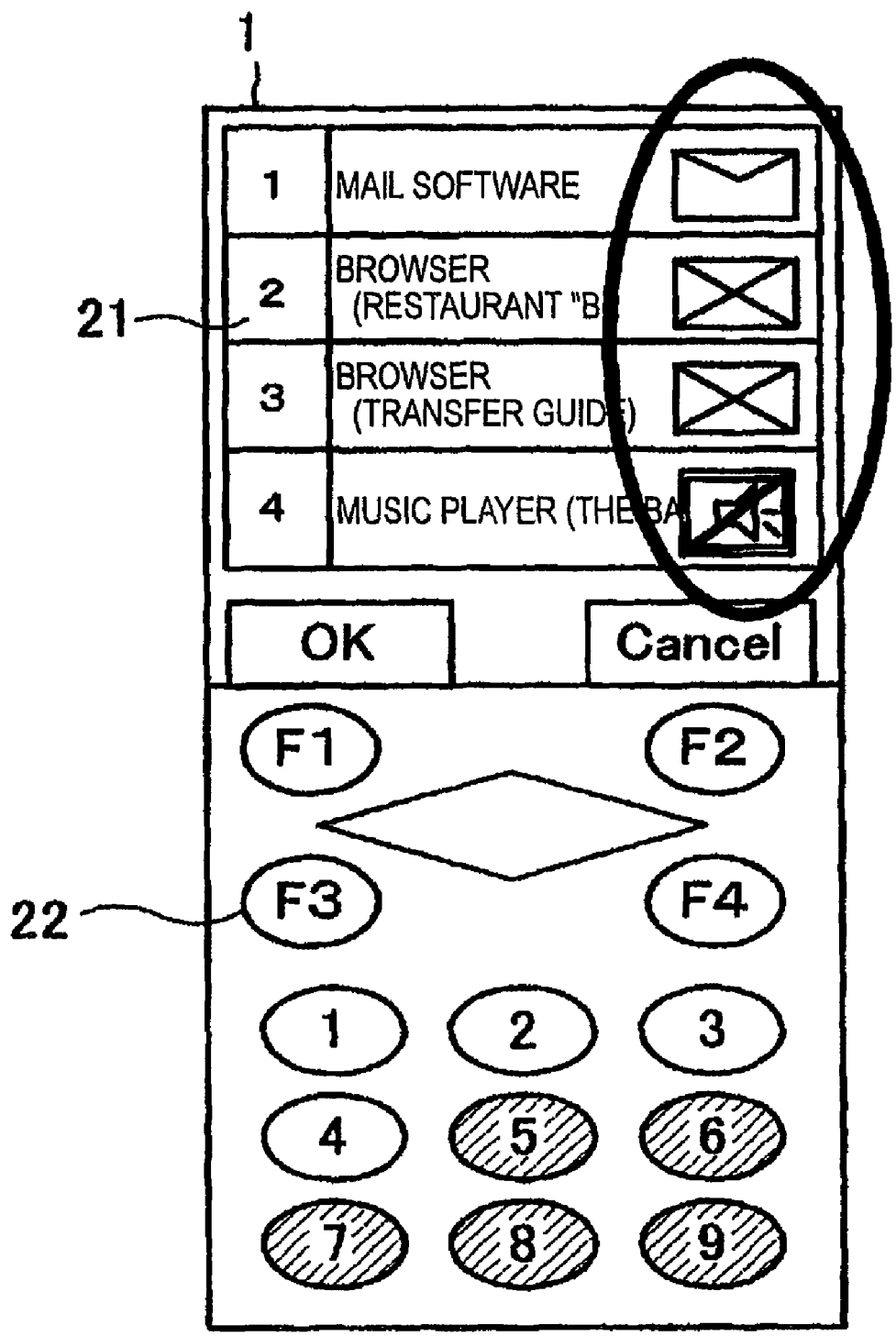
FIG. 25 is an explanatory view of an example for displaying a program operation in the long depression of the operation button using icons.

FIG. 25 shows a display example in which the operations of programs when operation buttons allocated to the respective programs are depressed can be previously noticed easily to the list of the programs to be displayed on the display part 21 using icons provided in the menu. For example, when creating a new mail, an envelope-type icon is displayed; when closing a browser, a window-mark icon with an x mark is used; and, when stopping a music player, an icon with a speaker erased by an oblique line is used. As a method for depressing an operation button, there are available a method for depressing the operation button long and a method for depressing the operation button short. In FIG. 25, these icons are shown in such a manner that they are enclosed with a thick ellipse sign.

Figure 26:
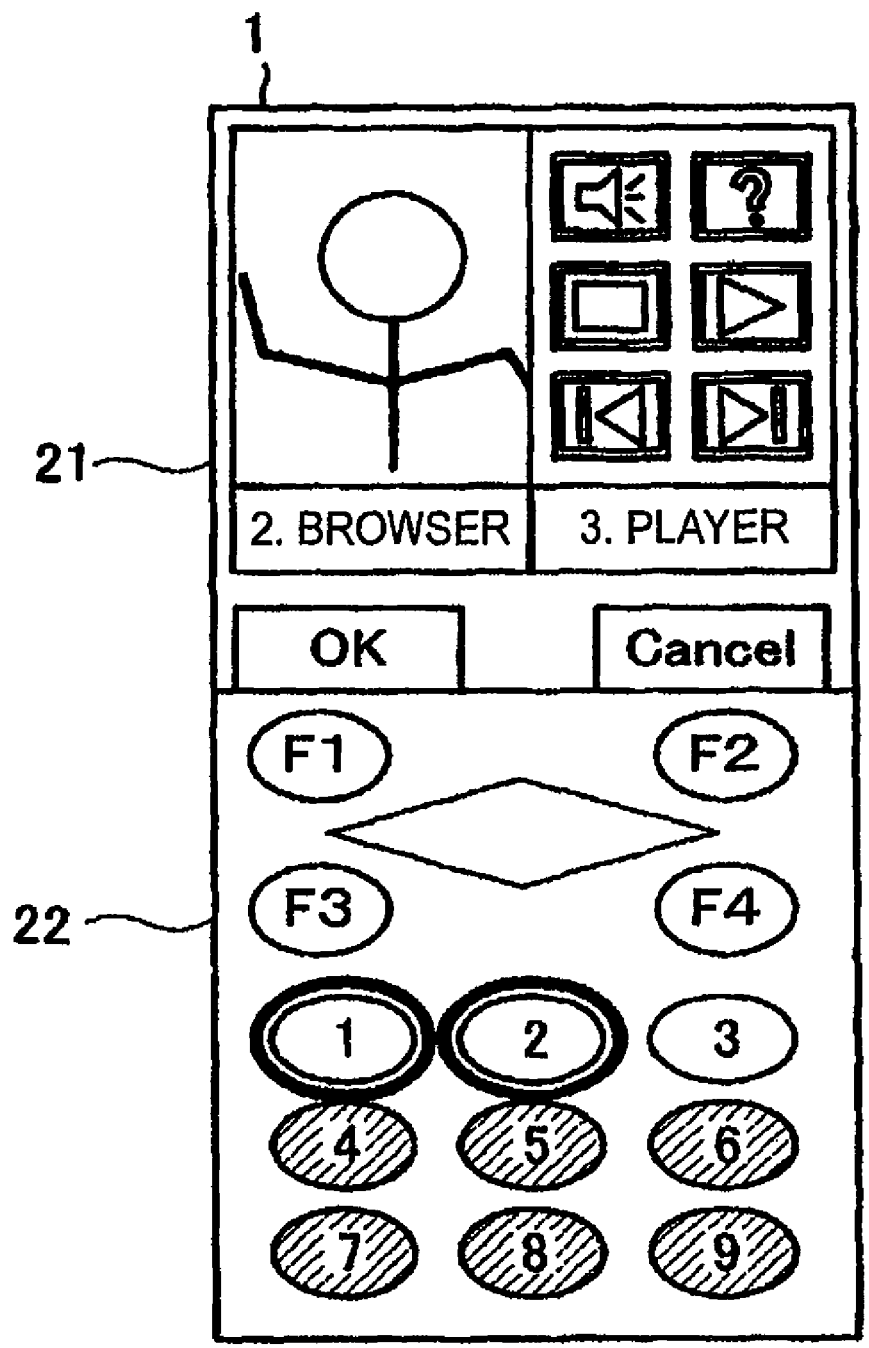
FIG. 26 is an explanatory view of a screen division state when two operation buttons are depressed simultaneously.

Also, FIG. 26 shows a display example in which two or more operation buttons (for example, buttons [1] and [2]) are depressed simultaneously. In FIG. 26, these buttons are shown enclosed with thick circle signs. In this case, two or more programs (for example, a browser and a music player) corresponding to the depressed operation buttons can be window-displayed while the screen is divided to the browser and music player. In structure, the detection of the operation button is one and, therefore, a phenomenon that two operation buttons are depressed simultaneously may be solved in terms of software.

When the two operation buttons are pressed down simultaneously, a task allocated to the operation button [1] depressed slightly earlier is activated. After detection of the depression of the operation button, the depression of the operation button [2] is detected. When the time from the depression of the operation button [1] to the depression of the operation button [2] is within a prescribed time (for example, several milliseconds), the specified task is regarded as "selection of two or more items". Thus, the screen is divided to two divisional screens and the task allocated to the operation button 2 is activated. On the other hand, when the time exceeds the prescribed time, it is judged that another task is selected.

Figure 27:
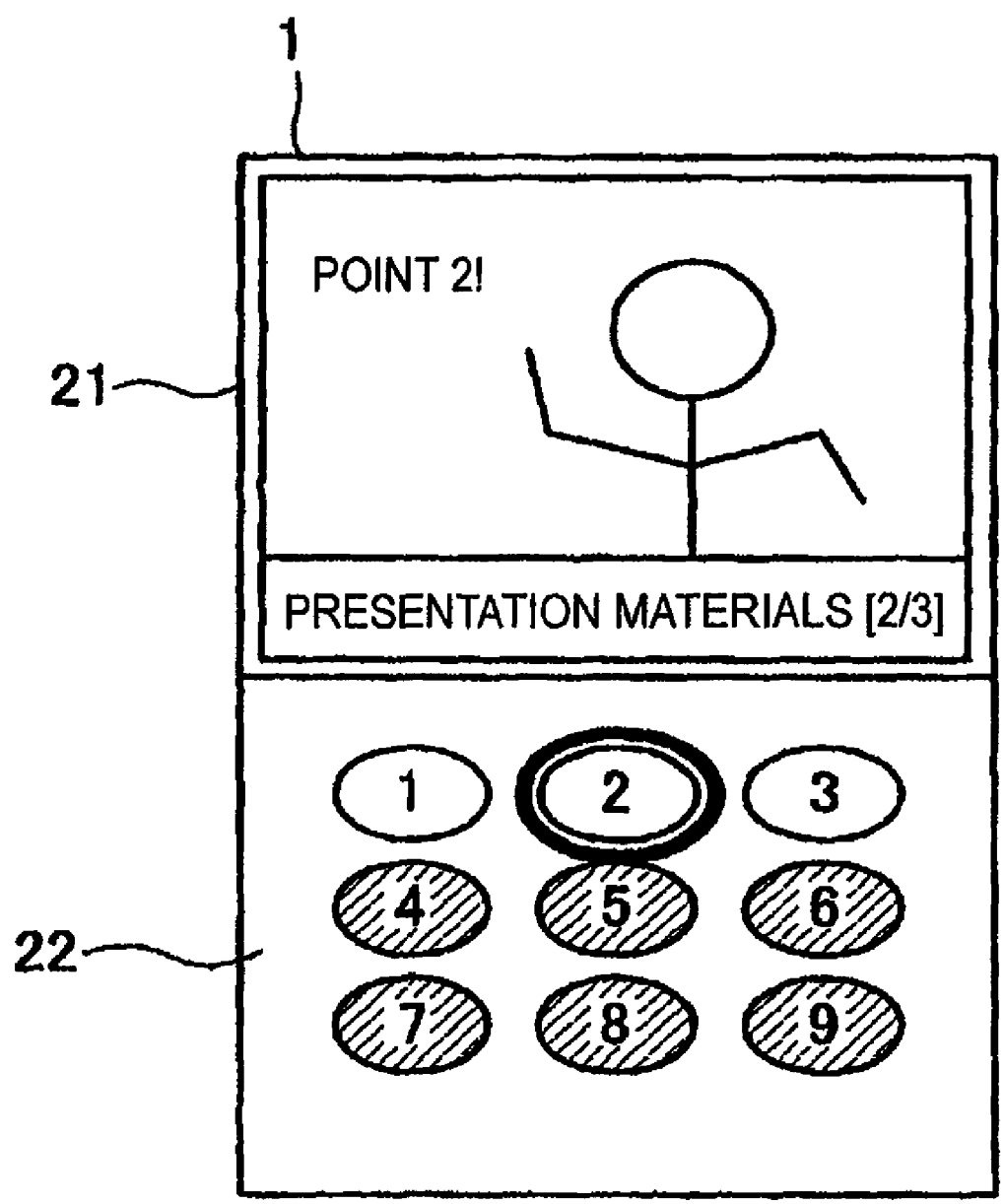
FIG. 27 is an explanatory view of a state in which numeral buttons are linked to their corresponding pieces of information contained in the contents.

FIG. 27 is a display example in which the operation buttons are linked to information (for example, page number) contained in a content under display. According to this example, the respective page numbers contained in presentation materials can be allocated to operation buttons [1]~[9] arranged in a numerical order and, therefore, a user is allowed to display a page directly by selecting the operation button corresponding to the page that the user wants to display. This structure can reduce the number of operations necessary to display the page and thus can facilitate the taking-out of information.

Figure 28:
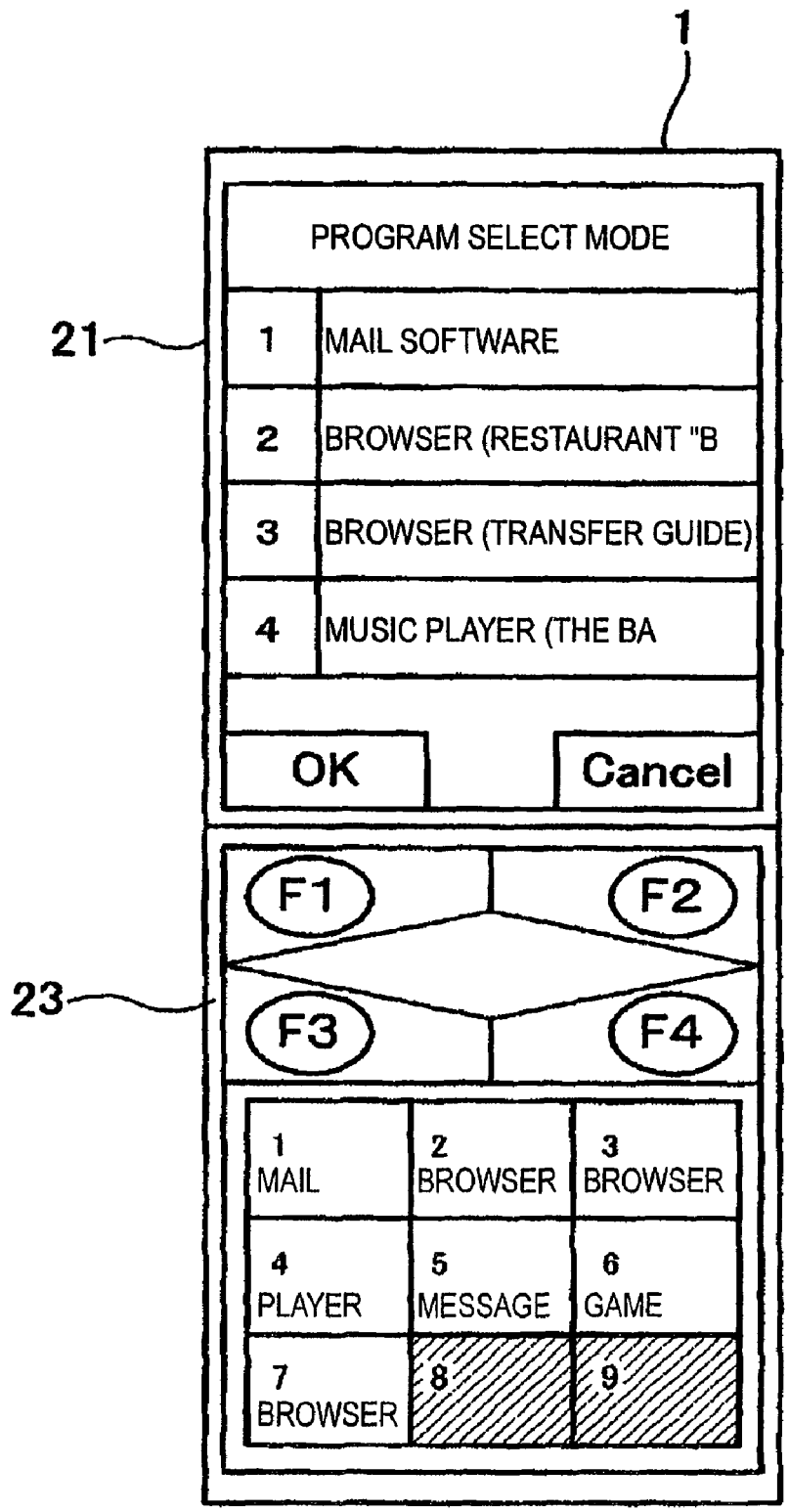
FIG. 28 is an explanatory view of a portable terminal apparatus in which its operation part is composed of a liquid crystal screen.

Further, when a part corresponding to the operation part, as shown in FIG. 28, is set for a display part such as a liquid crystal, the items of the program select menu screen can be set in the same arranged colors on, for example, seven-divided liquid crystal operation buttons [1]~[7]. Thanks to this, the contents of a menu to be displayed in a button unit may not be fixed but can be changed arbitrarily and easily. By the way, when the operation buttons themselves are made to display thereon character strings expressing the outlines of the items, the user can distinguish the operation buttons more easily.

The arranged colors of the liquid crystal operation buttons [1]~[7] and the character strings on the liquid crystal operation buttons [1]~[7] can be rewritten arbitrarily by software according to the changes of the programs displayed on the display part 21. Therefore, this structure is also able to cope with the selection of the diversifying programs.

As described above, a linkage list, in which the operation buttons 2 each with a backlight are linked to programs to be activated by the operation of the operation buttons 2, is previously stored in the link information storage means 14, the operation states of two or more programs to be activated in a terminal are monitored dynamically by the activation program monitor part 12, and when the two or more programs are activated, according to the results of such monitoring, the backlights of the operation buttons linked with the activated programs are allowed to emit. Therefore, the activation of the programs, the switching of the programs, the ending of the programs and other similar operations can be dynamically linked to the operation buttons with the reduced number of times of operation of the operation buttons. Thus, the selection of the programs can be carried out only by a simple button operation.

Although the invention has been described heretofore in detail and with reference to the specific embodiments thereof, it is obvious to persons skilled in the art that various changes and modifications are also possible without departing from the spirit and scope of the invention.

The present patent application is based on the Japanese patent application No. 2004-333137 filed on Nov. 17, 2004 and thus the contents thereof are incorporated into the present application for reference.

INDUSTRIAL APPLICABILITY

A portable terminal apparatus and a program select method according to the invention can notify a user of the operation states of two or more programs to be activated in a terminal through the emitting light colors and light emitting patterns of the backlights of operation buttons, thereby providing an effect that the user can select one of the operation buttons corresponding not only to the states of the programs such as whether the programs are under activation or not, whether the programs are under the background operation or not, or whether the programs are waiting for an instruction or not, but also to the kinds of the programs. Thus, the invention can be used effectively in a portable terminal and a program select method.

The invention claimed is:

1. A portable terminal apparatus, comprising:
a plurality of operation buttons; and
a link information storage that stores information on linkage between the operation buttons and programs to be activated by selection of the operation buttons, respectively;
wherein, when a plurality of the operation buttons are selected simultaneously or within a prescribed time period, which is indicative of contemporaneous activation of a plurality of programs associated with the plurality of the operation buttons if those buttons are selected during that time period, the programs linked with the respective selected operation buttons are configured to be displayed contemporaneously in a plurality of divided sections of a display screen, respectively, and
wherein when an interval between a selection of a first operation button and a selection of a second operation button exceeds the prescribed time period, the display screen is configured to display the program linked with the later-selected second operation button without displaying the program linked with the first operation button.

2. The portable terminal apparatus of claim 1, wherein when two of the operation buttons are selected simultaneously or within the prescribed time period, two programs linked with the respective selected operation buttons are configured to be displayed contemporaneously in two divided sections of a display screen, respectively.

3. The portable terminal apparatus of claim 1, wherein the prescribed time period is one second or less.

4. The portable terminal apparatus of claim 3, wherein the prescribed time period is five milliseconds or less.

* * * * *